US 12,140,199 B2

(12) United States Patent
Kawano et al.

(10) Patent No.: US 12,140,199 B2
(45) Date of Patent: Nov. 12, 2024

(54) DUST COVER, SUSPENSION DEVICE, AND METHOD FOR MANUFACTURING DUST COVER

(71) Applicants: SUBARU CORPORATION, Tokyo (JP); EXCELL CORPORATION, Matsudo (JP)

(72) Inventors: Hiroo Kawano, Tokyo (JP); Shoji Shimizu, Kiryu (JP)

(73) Assignees: SUBARU CORPORATION, Tokyo (JP); EXCELL CORPORATION, Matsudo (JP)

(*) Notice: Subject to any disclaimer, the term of this patent is extended or adjusted under 35 U.S.C. 154(b) by 403 days.

(21) Appl. No.: 17/410,728

(22) Filed: Aug. 24, 2021

(65) Prior Publication Data

US 2021/0381572 A1 Dec. 9, 2021

Related U.S. Application Data

(63) Continuation of application No. PCT/JP2019/048307, filed on Dec. 10, 2019.

(30) Foreign Application Priority Data

Mar. 27, 2019 (JP) ................................. 2019-060543

(51) Int. Cl.
*F16F 9/38* (2006.01)
*B29C 49/48* (2006.01)
(Continued)

(52) U.S. Cl.
CPC ............ *F16F 9/38* (2013.01); *B29C 49/4815* (2013.01); *B60G 15/067* (2013.01); *F16J 3/042* (2013.01);
(Continued)

(58) Field of Classification Search
CPC ...... F16F 9/38; F16F 2224/02; F16F 2226/04; B29L 2031/30; F16J 3/042; F16J 15/52;
(Continued)

(56) References Cited

U.S. PATENT DOCUMENTS 10,203,015 B2 * 2/2019 Ando .................... B60G 15/063
2002/0189441 A1 * 12/2002 Collis ....................... F16F 9/38
92/165 R
(Continued)

FOREIGN PATENT DOCUMENTS

CN 103210233 A 7/2013
CN 104487731 A 4/2015
(Continued)

OTHER PUBLICATIONS

European Patent No. EP 0407360 to Evangelisti published on Jan. 9, 1991.*
(Continued)

*Primary Examiner* — Pamela Rodriguez
(74) *Attorney, Agent, or Firm* — MCGINN I.P. LAW GROUP, PLLC (57) ABSTRACT

A dust cover is configured to cover an outer side of a damper extending in a predetermined direction. The dust cover includes bellows portions and a flange portion. The bellows portions are inclined alternately toward a radially outer side and a radially inner side in an axial direction. The flange portion extends radially outward from a cylindrical portion of the dust cover. The flange portion protrudes radially outward from the cylindrical portion of the dust cover by a dimension larger than a height dimension in a radial direction between a radially inner end and a radially outer end of each of the bellows portions. A thickness of the flange portion is larger than a thickness of the radially outer end of each of the bellows portions.

6 Claims, 8 Drawing Sheets

(51) Int. Cl.
 B29K 101/12 (2006.01)
 B29L 31/30 (2006.01)
 B60G 15/06 (2006.01)
 F16J 3/04 (2006.01)
 F16J 15/52 (2006.01)

(52) U.S. Cl.
 CPC ....... *F16J 15/52* (2013.01); *B29C 2049/4892* (2013.01); *B29K 2101/12* (2013.01); *B29L 2031/30* (2013.01); *B60G 2202/312* (2013.01); *B60G 2204/1242* (2013.01); *B60G 2204/128* (2013.01); *B60G 2204/40* (2013.01); *B60G 2206/012* (2013.01); *B60G 2206/7104* (2013.01); *B60G 2206/81* (2013.01); *B60G 2800/162* (2013.01); *F16F 2224/02* (2013.01); *F16F 2226/04* (2013.01)

(58) Field of Classification Search
 CPC .... B60G 2202/0312; B60G 2204/1242; B60G 2204/128; B60G 2204/40; B60G 2206/012; B60G 2206/424; B60G 2206/7104; B60G 2206/81; B60G 2800/162; B60G 15/067; B60G 2202/312; B29C 49/4815; B29C 2049/4892
 See application file for complete search history.

(56) References Cited

U.S. PATENT DOCUMENTS

| | | |
|---|---|---|
| 2011/0156327 A1 | 6/2011 | Nobusue et al. |
| 2014/0035232 A1* | 2/2014 | Matsumura ............. F16J 15/52 264/505 |
| 2015/0240903 A1 | 8/2015 | Nagai et al. |
| 2016/0075207 A1 | 3/2016 | Tsunekawa et al. |
| 2016/0089952 A1 | 3/2016 | Kato |
| 2017/0321779 A1 | 11/2017 | Miwa et al. |

FOREIGN PATENT DOCUMENTS

| | | |
|---|---|---|
| EP | 0 844 419 A2 | 5/1998 |
| JP | S 60-035938 U | 3/1985 |
| JP | S60-199632 A | 10/1985 |
| JP | 62-165041 A | 7/1987 |
| JP | 04-173123 A | 6/1992 |
| JP | 05-228986 A | 9/1993 |
| JP | H10-159975 A | 6/1998 |
| JP | H10213223 A | 8/1998 |
| JP | 2008-240774 A | 10/2008 |
| JP | 2015-190552 A | 11/2015 |
| JP | 2016-048081 A | 4/2016 |
| JP | 2016-084890 A | 5/2016 |
| JP | 2016-089935 A | 5/2016 |
| JP | 2017-133550 A | 8/2017 |
| WO | 2006/054338 A1 | 5/2006 |

OTHER PUBLICATIONS

Extended European Search Report issued Oct. 19, 2022, for European Patent Application No. 19921675.5.
International Search Report (ISR) (PCT Form PCT/ISA/210), in PCT/JP2019/048307, dated Feb. 4, 2020 and English Translation.
Written Opinion of the International Searching Authority (PCT Form PCT/ISA/237), in PCT/JP2019/048307, dated Feb. 4, 2020.
Extended European Search Report, Dated Nov. 24, 2023, EPO Patent Application No. 23207598.6.
Chinese Office Action 201980093880.2 issued on Apr. 29, 2024 with English translation thereof.
Chinese Office Action, dated Aug. 16, 2024 in Chinese Application No. 201980093880.2 and English Translation Thereof.

* cited by examiner

DUST COVER, SUSPENSION DEVICE, AND METHOD FOR MANUFACTURING DUST COVER

CROSS REFERENCE TO RELATED APPLICATIONS

This application is a continuation of PCT application No. PCT/JP2019/048307, which was filed on Dec. 10, 2019 based on Japanese Patent Application (No. 2019-060543) filed on Mar. 27, 2019, the contents of which are incorporated herein by reference.

The present disclosure relates to a dust cover that covers an outer side of a damper used in a vehicle. The present disclosure also relates to a suspension device including the dust cover, and a method for manufacturing the dust cover.

JP-A-2016-048081 discloses an automobile suspension device including a damper extending in a predetermined direction, coil springs disposed radially outside the damper, and a dust cover that is formed of a thermoplastic resin and covers an outer side of the damper inside the coil springs. In the suspension device of JP-A-2016-048081, the dust cover includes bellows portions and a flange portion. The flange portion is formed at an end portion of the bellows portions and has a larger outer diameter than the bellows portions. The flange portion is interposed between a mount portion and a seat rubber. The mount portion is attached to a vehicle body side, and an upper end side of the damper is fixed to the mount portion. The seat rubber receives an upper end of the coil springs.

The dust cover is formed of a thermoplastic resin, and is manufactured by blow molding. In the blow molding, air is fed into an inner side of the thermoplastic resin in a state where a molten tubular thermoplastic resin is disposed in a mold, and the thermoplastic resin is expanded in a radial direction and is deformed into a shape along an inner wall surface of the mold. That is, in the blow molding, a thickness of a portion of the thermoplastic resin having a large radial dimension is smaller than a thickness of the other portion. Accordingly, a thickness of a radially outer end of the bellows portions is smaller than a thickness of a radially inner end of the bellows portions, and the dust cover can expand and contract in an axial direction by deforming a radially outer end side of the bellows portions.

As in the dust cover disclosed in Patent Literature 1 in which the flange portion is provided in a cylindrical portion of the dust cover, when the flange portion has a larger outer diameter than the bellows portions, a thickness of the flange portion becomes smaller than a thickness of the radially outer end of each of the bellows portions during blow molding. As a result, strength of the flange portion of the dust cover might not be sufficiently ensured.

SUMMARY

The present disclosure relates to a dust cover, a suspension device including the dust cover, and a method of manufacturing the dust cover that uses a thermoplastic resin and ensures strength of a flange portion.

In accordance with one or more embodiments, a dust cover is formed of a thermoplastic resin, is configured to cover an outer side of a damper extending in a predetermined direction, and is substantially cylindrical. The dust cover includes bellows portions and a flange portion. The bellows portions are formed in a predetermined section in an axial direction in the dust cover, and inclined alternately toward a radially outer side and a radially inner side in the axial direction. Each of the bellows portions has a radially outer end thinner than a radially inner end. The bellows are configured to expand and contract in the axial direction. The flange portion is formed at a predetermined position in the axial direction of the dust cover and extends radially outward from a cylindrical portion of the dust cover. The flange portion protrudes radially outward from the cylindrical portion of the dust cover by a dimension larger than a height dimension in a radial direction between the radially inner end and the radially outer end of each of the bellows portions. A thickness of the flange portion is larger than a thickness of the radially outer end of each of the bellows portions.

In accordance with one or more embodiments, a suspension device includes a dust cover, a damper, a coil spring, a mount portion, and an upper seat. The dust cover includes bellows portions that are configured to expand and contract in an axial direction and a flange portion that extends radially outward. The dust cover is disposed such that the axial direction is an upper-lower direction. A radially outer side of the damper is covered by the dust cover. The coil spring is disposed at a radially outer side of the dust cover. To the mount portion, an upper end side of the damper is connected. The mount portion is attached to a vehicle body. The upper seat is disposed at a lower side of the mount portion and is configured to receive an upper end of the coil spring. The flange portion of the dust cover is interposed between the mount portion and the upper seat.

In accordance with one or more embodiments, a suspension device includes a dust cover, a damper, a coil spring, a mount portion, and an upper seat. The dust cover includes bellows portions that are configured to expand and contract in an axial direction and a flange portion that extends radially outward. The dust cover is disposed such that the axial direction is an upper-lower direction. A radially outer side of the damper is covered by the dust cover. The coil spring is disposed at a radially outer side of the dust cover. To the mount portion, an upper end side of the damper is connected. The mount portion is attached to a vehicle body. The upper seat is disposed at a lower side of the mount portion and receives an upper end of the coil spring. The flange portion of the dust cover is interposed between the mount portion and the upper seat. The mount portion includes a recessed portion that is formed on a lower surface of the mount portion and receives the protrusion of the dust cover.

In accordance with one or more embodiments, a dust cover including bellows portions that are configured to expand and contract in an axial direction and a flange portion that extends radially outward. An inner wall surface of a mold has a recess corresponding to the flange portion. The mold has a variable device configured to change an axial dimension of the recess between a primary molding distance and a final molding distance. The final molding distance corresponds to a thickness of the flange portion. The primary molding distance is larger than the final molding distance. The dust cover is manufactured by: placing a molten thermoplastic resin having a tubular shape inside the mold in a state where an axial dimension of the recess of the inner wall surface is set to the primary molding distance; blowing air into the thermoplastic resin placed inside the mold to deform the thermoplastic resin along the inner wall surface of the mold; and compressing, in the axial direction, a portion of the thermoplastic resin that enters the recess, by changing the axial dimension of the recess of the inner wall surface to the final molding distance.

In accordance with one or more embodiments, a substantially cylindrical dust cover is configured to cover an outer side of a damper extending in a predetermined direction and includes bellows portions that are configured to expand and contract in an axial direction and a flange portion that extends radially outward. An inner wall surface of a mold has a recess corresponding to the flange portion. The mold has a variable device that is configured to change an axial dimension of the recess between a primary molding distance and a final molding distance. The final molding distance corresponds to a thickness of the flange portion. The primary molding distance is larger than the final molding distance. The dust cover is manufactured by: placing a molten thermoplastic resin having a tubular shape inside the mold in a state where an axial dimension of the recess of the inner wall surface is set to the primary molding distance; blowing air into the thermoplastic resin placed inside the mold to deform the thermoplastic resin along the inner wall surface of the mold; and compressing, in the axial direction, a portion of the thermoplastic resin that enters the recess by changing the axial dimension of the recess of the inner wall surface to the final molding distance.

BRIEF DESCRIPTION OF DRAWINGS

The accompanying drawings are included to provide a further understanding of the disclosure and are incorporated in and constitute a part of this specification. The drawings illustrate an embodiment and, together with the specification, serve to explain the principles of the disclosure.

DESCRIPTION OF EMBODIMENTS

Figure 1:
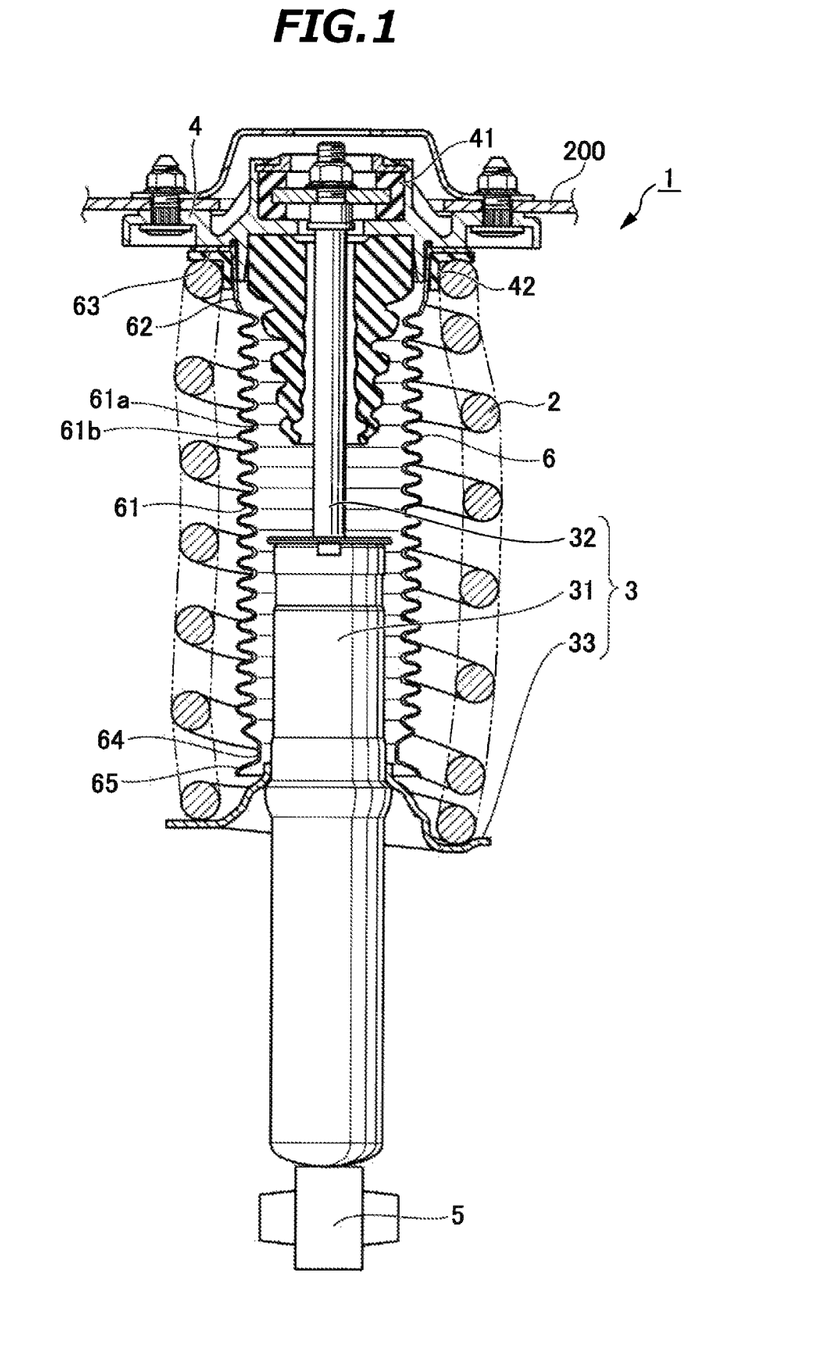
FIG. 1 is a schematic diagram showing a suspension device according to an embodiment.
Figure 2:
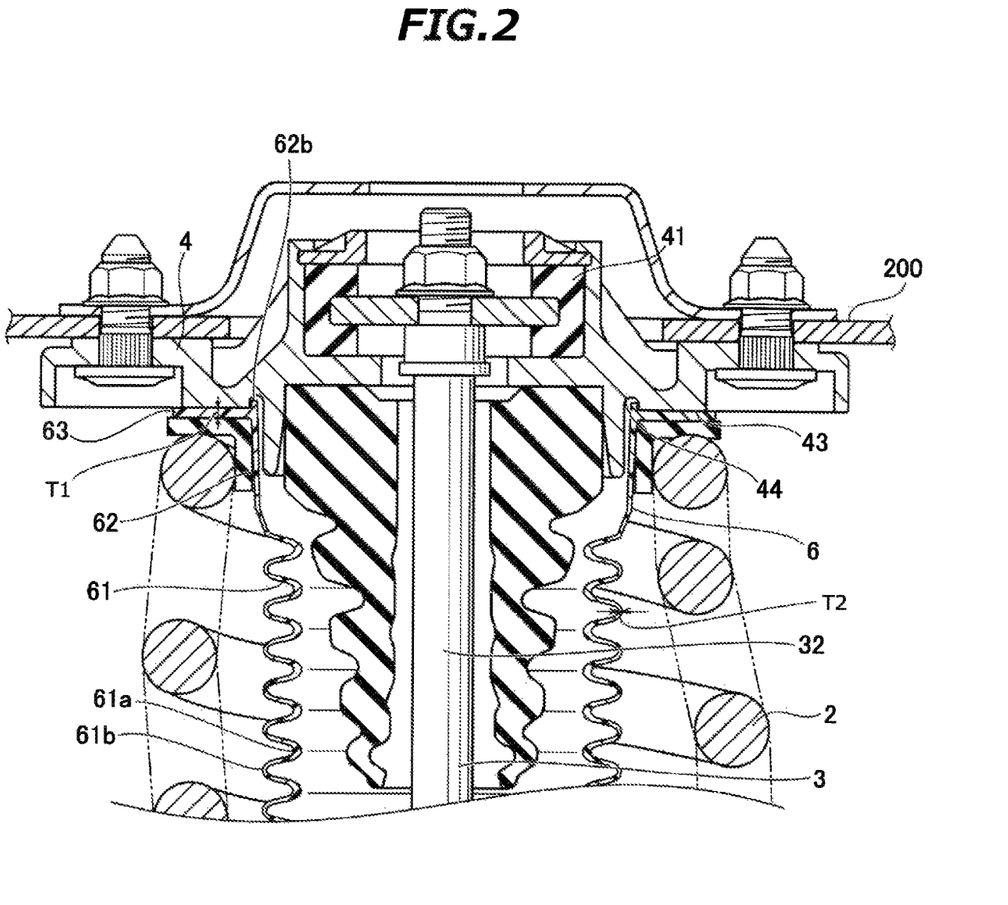
FIG. 2 is an enlarged diagram showing an upper portion of the suspension device.
Figure 3:
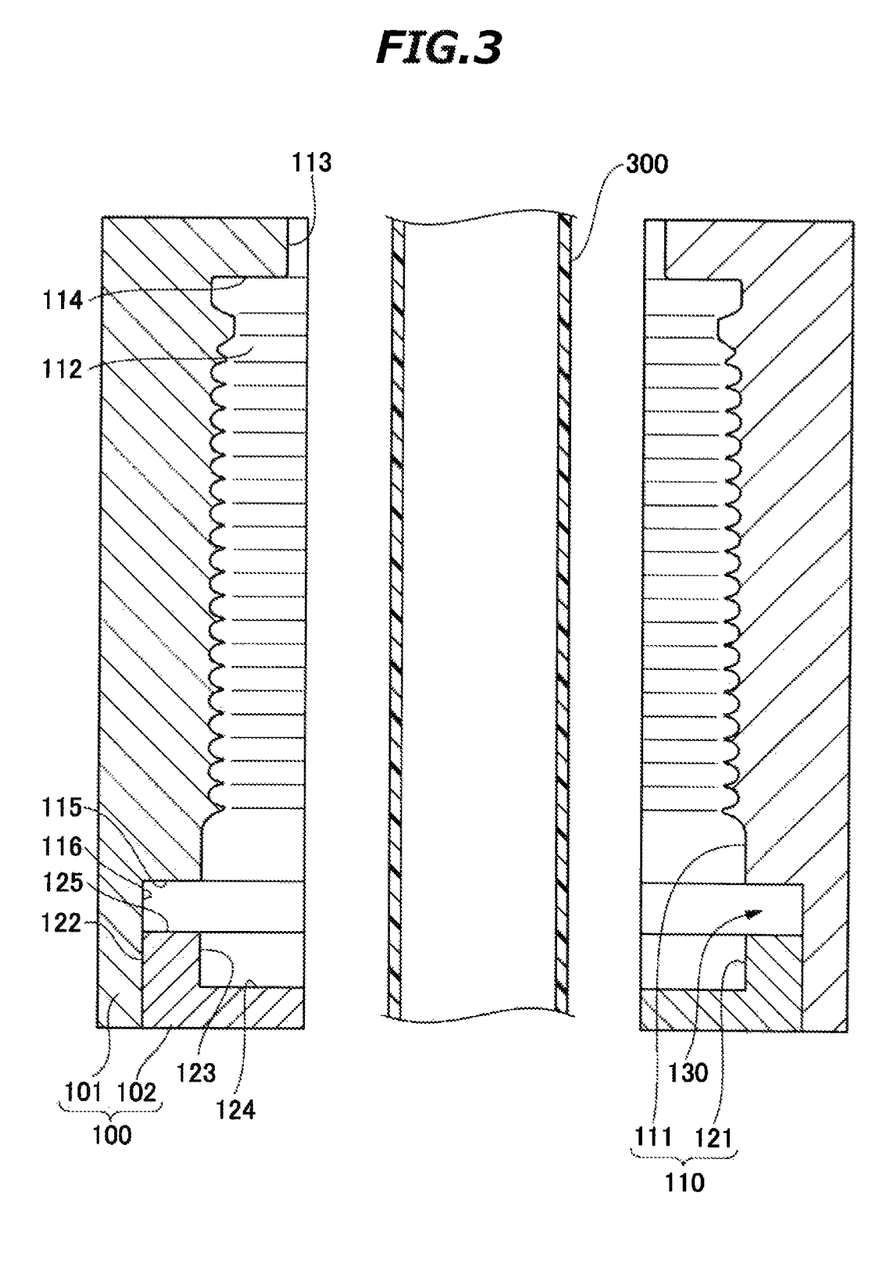
FIG. 3 is a diagram showing a state in which a tubular molten resin is placed between divided molds.
Figure 4:
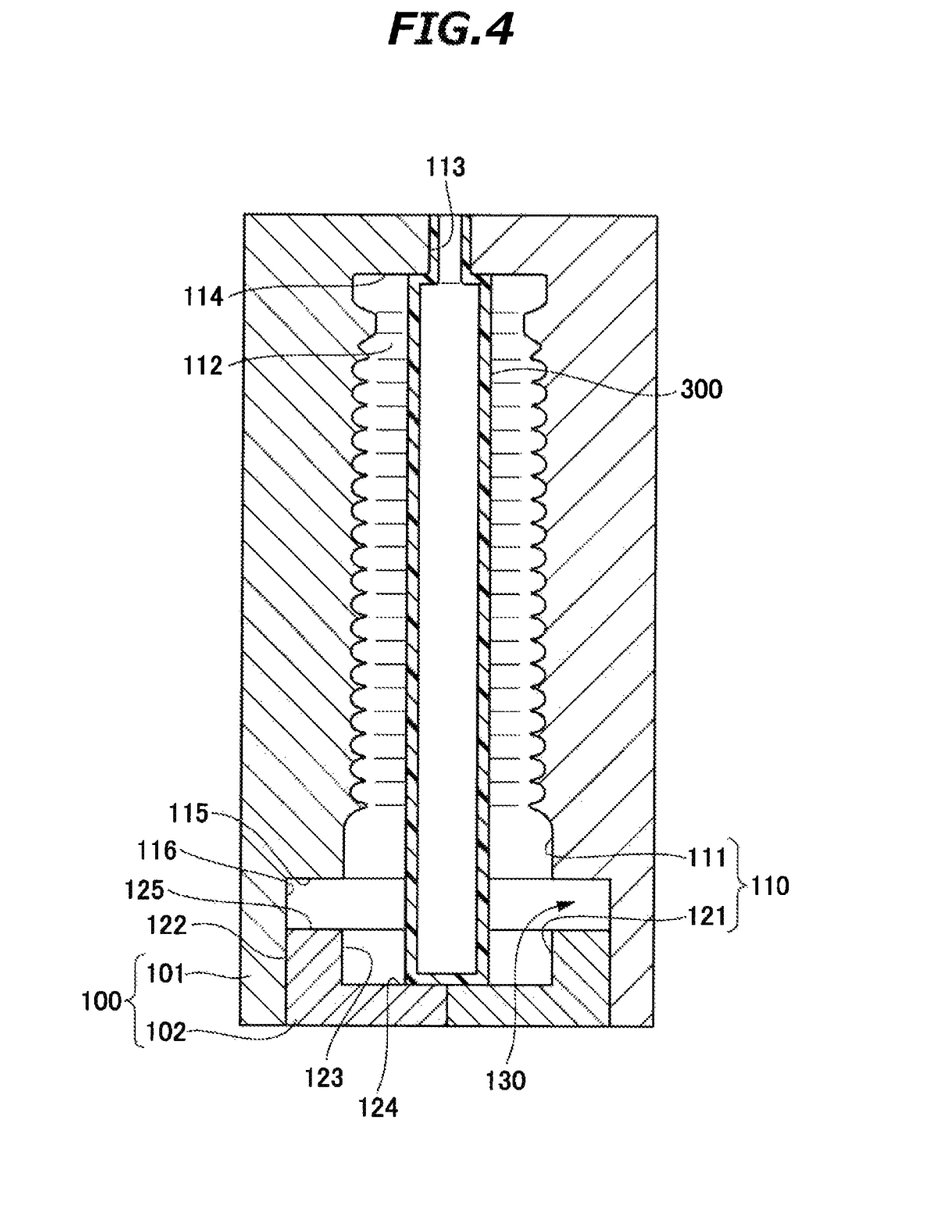
FIG. 4 is a diagram showing a state in which the molten resin is placed in a closed mold.
Figure 5:
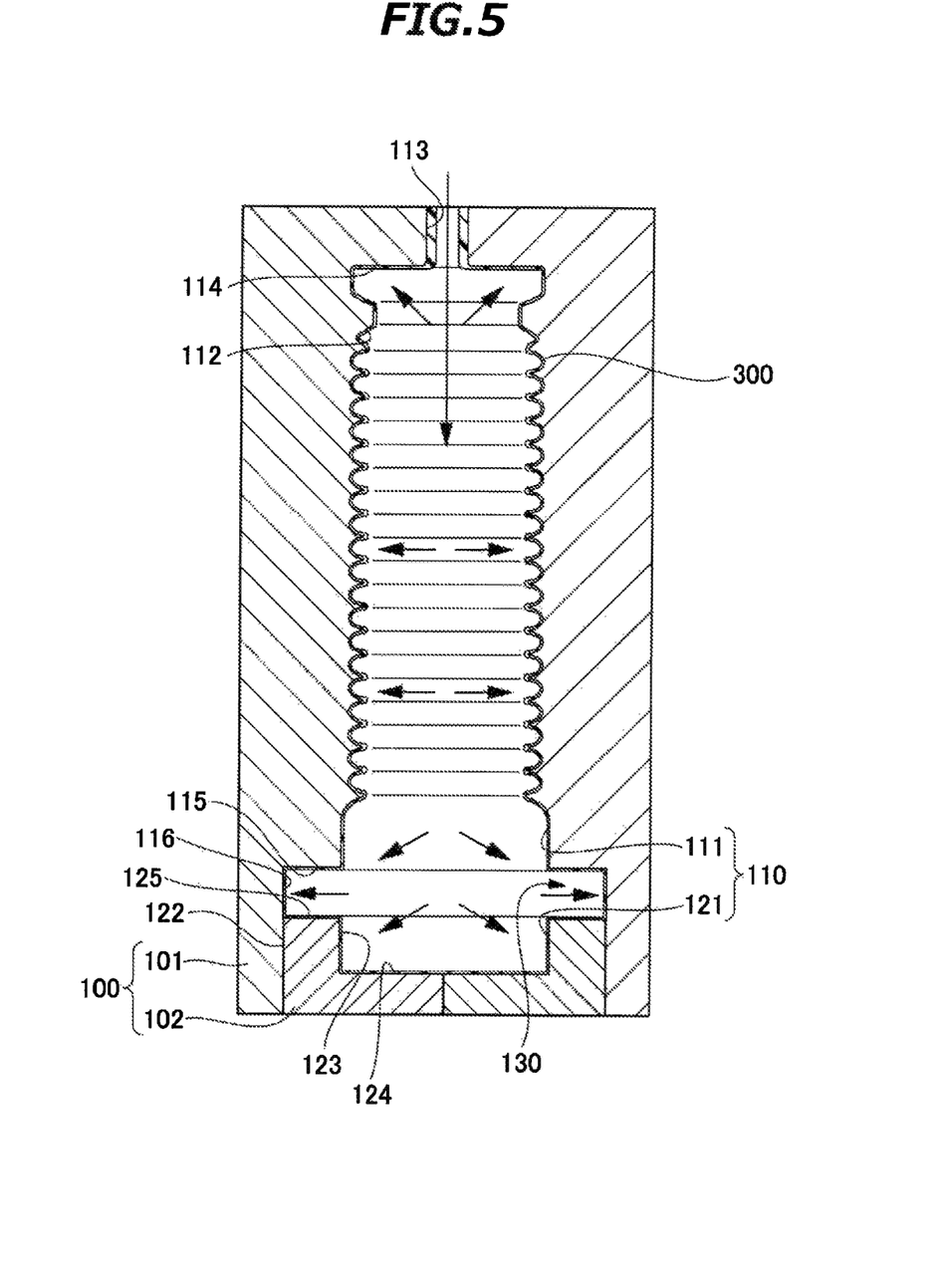
FIG. 5 is a diagram showing a state in which air is fed into the molten resin in the mold.
Figure 6:
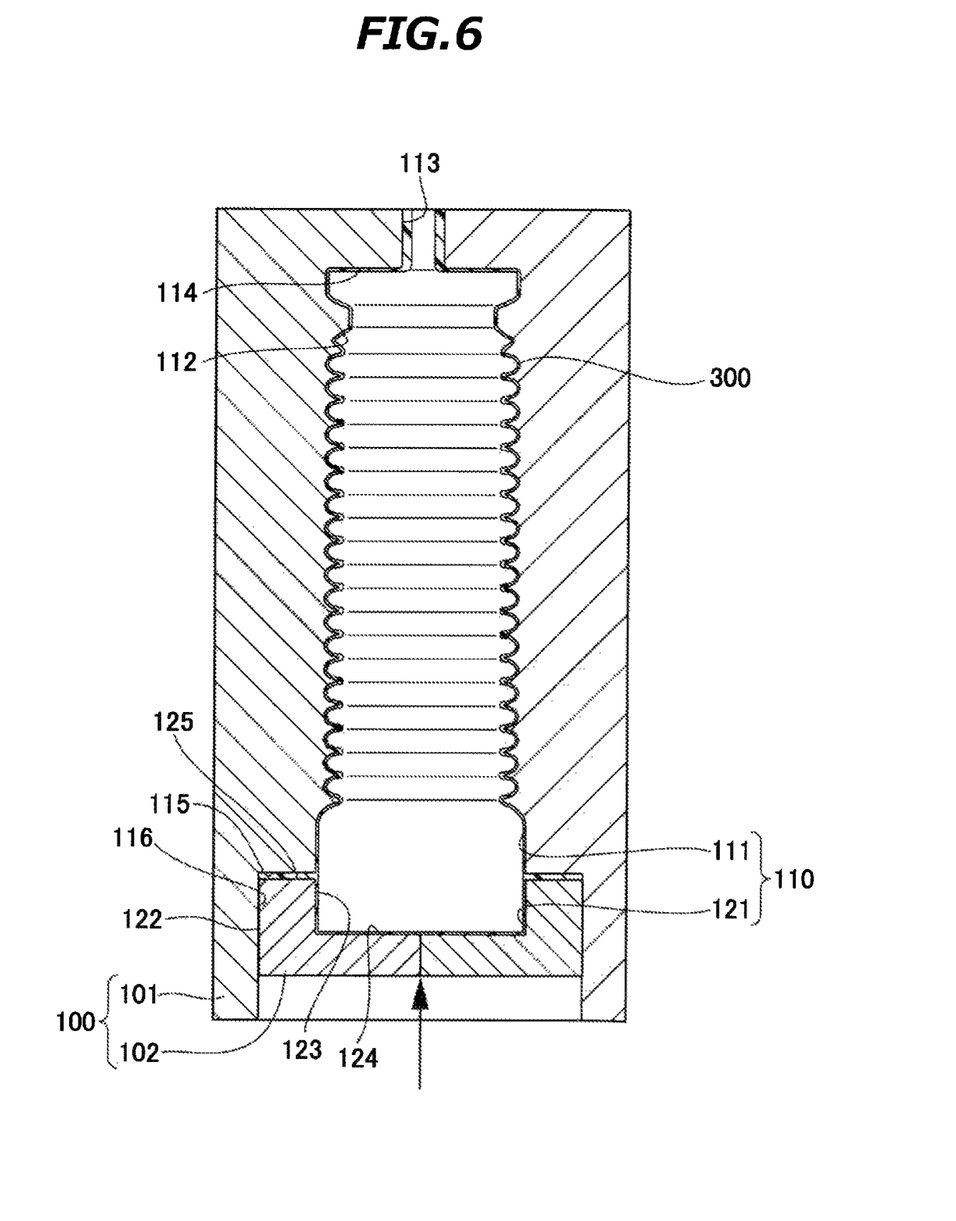
FIG. 6 is a diagram showing a state in which the molten resin in a recess of an inner wall surface of the mold is compressed.
Figure 7:
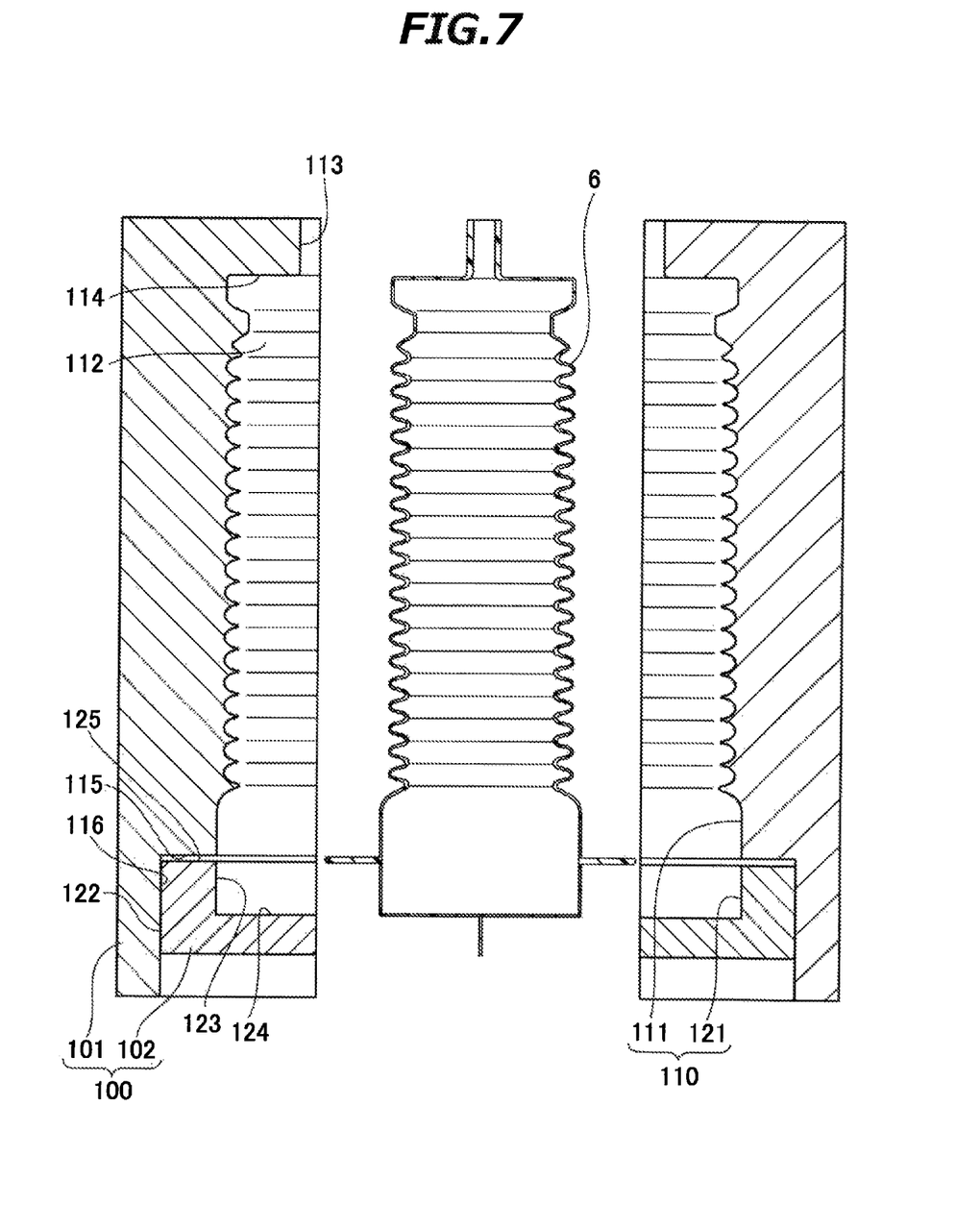
FIG. 7 is a diagram showing a state in which the mold is divided to take out a solidified and hollow resin molded product.
Figure 8:
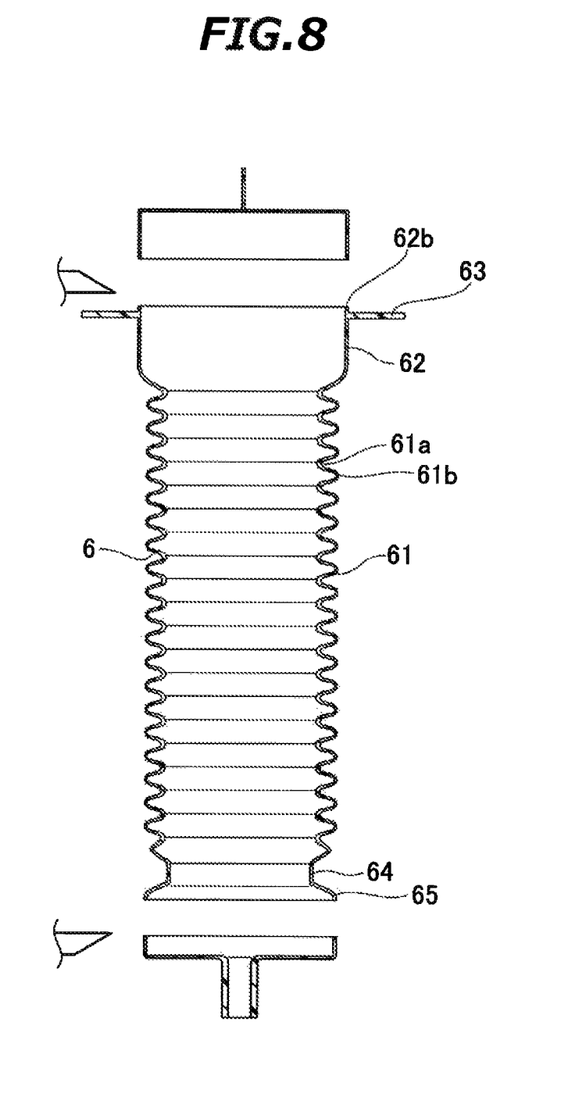
FIG. 8 is a diagram showing a state in which two ends in an axial direction of the hollow resin molded product are cut out.

An exemplary embodiment will be described with reference to FIGS. 1 to 8. FIG. 1 is a schematic diagram showing a suspension device. FIG. 2 is an enlarged diagram showing the suspension device. FIG. 3 is a diagram showing a state in which a tubular molten resin is placed between divided molds. FIG. 4 is a diagram showing a state in which the molten resin is placed in a closed mold. FIG. 5 is a diagram showing a state in which air is fed into the molten resin in the mold. FIG. 6 is a diagram showing a state in which the molten resin in a recess of an inner wall surface of the mold is compressed. FIG. 7 is a diagram showing a state in which the mold is divided to take out a solidified and hollow resin molded product. FIG. 8 is a diagram showing a state in which two ends in an axial direction of the hollow resin molded product are cut out.

As shown in FIG. 1, a suspension device 1 includes coil springs 2 that are disposed between a vehicle body 200 and a wheel (not shown) and elastically receive an up-down movement of a wheel relative to the vehicle body 200, and a damper 3 that is disposed inside the coil springs 2 and attenuates the up-down movement. The suspension device 1 includes a mount portion 4 to which an upper end side of the damper 3 is attached and that is fixed to the vehicle body 200, and a bracket 5 that is formed at a lower end side of the damper 3 and is coupled to a wheel side. The suspension device 1 further includes a dust cover 6 that is disposed inside the coil springs 2 and covers an outer side of the damper 3. In the present embodiment, the dust cover 6 is disposed such that an axial direction is an upper-lower direction.

The damper 3 includes a cylinder case 31 extending in the upper-lower direction, and a piston rod 32 that extends upward from an upper end of the cylinder case 31 and can move in the upper-lower direction. An upper end side of the piston rod 32 is fixed to the mount portion 4 via a bush 41 formed of a rubber material. In the present embodiment, the bracket 5 is provided at a lower end of the cylinder case 31. The damper 3 further includes a lower seat 33 that extends radially outward from the cylinder case 31 and receives a lower end of the coil springs 2.

The lower end of the coil springs 2 is received by the lower seat 33, and an upper end of the coil springs 2 is received by an upper seat 42 that is formed of a rubber material and is disposed below the mount portion 4. A flange portion 63 of the dust cover 6 is interposed between the mount portion 4 and the upper seat 42.

The dust cover 6 is formed of a thermoplastic resin and is manufactured by blow molding. The term "thermoplastic resin" used here includes not only a plastic having a relatively low hardness but also a thermoplastic elastomer that is flexible and exhibits rubber elasticity. Examples of the thermoplastic resin of the dust cover 6 include polyethylene such as low-density polyethylene (LDPE) and linear low-density polyethylene (L-LDPE), and a thermoplastic elastomer such as an olefin-based elastomer (TPO), a dynamically cross-linked elastomer (TPV), a polyester-based elastomer (TPC), and a urethane-based elastomer (TPU). The thermoplastic resin of the dust cover 6 has flexibility, and a flexural modulus or tensile modulus of the thermoplastic resin is preferably 1000 MPa or less, and more preferably 500 MPa or less.

The dust cover 6 is formed into a substantially cylindrical shape, and covers an outer side of the damper 3 from the upper seat 42 to the lower seat 33. The dust cover 6 includes bellows portions 61 formed in a predetermined section in the axial direction, an upper end side cylindrical portion 62 extending upward from an upper end of the bellows portions 61, the flange portion 63 extending radially outward from a predetermined portion in the axial direction of the upper end side cylindrical portion 62, a lower end side cylindrical portion 64 extending downward from a lower end of the bellows portions 61, and an expanded lower end portion 65 that is expanded downward from a lower end of the lower end side cylindrical portion 64. The bellows portions 61 are inclined alternately toward a radially inner side and a radially outer side in the upper-lower direction. A radially outer end of each of the bellows portions 61 is formed to be thinner than a radially inner end. The bellows portions 61 can expand and contract in the upper-lower direction. In the present embodiment, the flange portion 63 is disposed on an upper end side of the dust cover 6, and the upper end side of the dust cover 6 is attached to another component by engaging the flange portion 63 with the component. As shown in FIG. 2, in the present embodiment, the flange portion 63 is formed to be separated from an upper end of the upper end side cylindrical portion 62. A protrusion 62b protruding upward from an upper surface of the flange portion 63 is formed at an upper side of the upper end side cylindrical portion 62 above the flange portion 63.

In the present embodiment, the protrusion 62b is received in a recessed portion 44 formed in a lower surface 43 of the mount portion 4 in a manner of extending in a circumferential direction. Here, the flange portion 63 protrudes radially outward from the upper end side cylindrical portion 62 of the dust cover 6 by a dimension larger than a height dimension in the radial direction between the radially inner end and the radially outer end of each of the bellows portions 61. That is, the flange portion 63 protrudes radially outward by a dimension larger than a radial dimension between a valley portion 61a and a peak portion 61b of the bellows portion 61. A thickness T1 of the flange portion 63 is formed to be larger than a thickness T2 of the radially outer end of each of the bellows portions 61. Therefore, strength of the flange portion can be ensured by making the thickness of the flange portion 63 relatively large while ensuring an expansion and contraction function by making the thickness of the radially outer end of each of the bellows portions 61 relatively small. A ratio of the thickness of the flange portion 63 to the thickness of the bellows portions 61 can be set freely. For example, a thickness of a radially outer end of the flange portion 63 may be twice or more the thickness of the radially outer end of each of the bellows portions 61.

Since the dust cover 6 is manufactured by blow molding, a thickness of the dust cover 6 is not uniform. A thickness of each part of the dust cover 6 can be set freely. For example, a thickness of each of the upper end side cylindrical portion 62 and the lower end side cylindrical portion 64 may be 0.7 mm or more and 0.9 mm or less; a thickness of a base end of the flange portion 63 may be 0.8 mm or more and 1.2 mm or less; a thickness of a tip end of the flange portion 63 may be 0.6 mm or more and 1.0 mm or less; a thickness of the valley portion 61a of the bellows portion 61 may be 0.7 mm or more and 0.9 mm or less; and a thickness of the peak portion 61b of the bellows portion 61 may be 0.2 mm or more and 0.4 mm or less.

Here, a method for manufacturing the dust cover 6 will be described with reference to FIGS. 3 to 8.

As shown in FIGS. 3 to 7, an inner wall surface 110 of a mold 100 used in blow molding has a recess 130 corresponding to the flange portion 63, and the mold 100 has a variable device for changing an axial dimension of the recess 130. In the present embodiment, the mold 100 includes a first mold 101 in the axial direction and a second mold 102 in the axial direction, and the second mold 102 can move relative to the first mold 101 in the axial direction in a state where the mold 100 is closed, such that the variable device is implemented. In the example shown in FIGS. 3 to 7, the first mold 101 is disposed on an upper side, and the second mold 102 is disposed on a lower side. The variable device changes the axial dimension of the recess 130 to a final molding distance corresponding to the thickness of the flange portion 63 and a primary molding distance larger than the final molding distance. The first mold 101 and the second mold 102 can be divided on a plane passing through a central axis.

An inner wall surface 111 of the first mold 101 includes a main wall surface 112 having a shape corresponding to a lower side of the flange portion 63 of the dust cover 6, an introduction wall surface 113 formed corresponding to an air introduction port 310 of a molten resin 300 and extending in the upper-lower direction, a connection wall surface 114 connecting an upper end of the main wall surface 112 and a lower end of the introduction wall surface 113 and extending horizontally, a first flange wall surface 115 formed corresponding to the flange portion 63 of the dust cover 6 and extending from a lower end of the main wall surface 112 to left and right outer sides, and a vertical wall surface 116 extending downward from left and right outer ends of the first flange wall surface 115. The second mold 102 is disposed in a space defined by the vertical wall surface 116 of the first mold 101.

An outer wall surface 122 of the second mold 102 extends in the upper-lower direction and is in contact with the vertical wall surface 116 of the first mold 101. Accordingly, the second mold 102 closes the other axial end (lower end) of the first mold 101, and is guided by the vertical wall surface 116 of the first mold 101 to move in the axial direction. The inner wall surface 121 of the second mold 102 includes a main wall surface 123 having a shape corresponding to an upper side of the flange portion 63 of the dust cover 6, a closing wall surface 124 that extends horizontally from a lower end of the main wall surface 123 and closes a lower end side of the molten resin 300, and a second flange wall surface 125 formed corresponding to the flange portion 63 of the dust cover 6 and extending from an upper end of the main wall surface 123 to left and right outer sides. In the present embodiment, the recess 130 is formed by the first flange wall surface 115 and the vertical wall surface 116 of the first mold 110 and the second flange wall surface 125 of the second mold 102, and an axial dimension of the recess 130 is changed by a movement of the second mold 102 in the axial direction.

When the dust cover 6 is manufactured using the mold 100 having the above-described configuration, first, a thermoplastic resin serving as a raw material is melted and extruded into a cylindrical shape using an extruder to obtain the tubular molten resin 300. As shown in FIG. 3, the molten resin 300 is placed between the first mold 101 and second mold 102 obtained by dividing the mold 100 (preparation step).

Next, as shown in FIG. 4, the first mold 101 and the second mold 102 are closed, and the molten resin 300 is placed inside the mold 100 (placement step). At this time, the recess 130 of the inner wall surface 110 has a primary molding distance larger than the thickness of the flange portion 63. In the present embodiment, the dust cover 6 is formed in an upper-lower inverted state.

Then, as shown in FIG. 5, air is fed into the molten resin 300 placed inside the mold 100, and the molten resin 300 is deformed along the inner wall surface 110 of the mold 100 (primary molding step). At this time, the molten resin 300 also enters the recess 130 of the inner wall surface 110, but a thickness of the molten resin 300 in the recess 130 is smaller than that in the other portion.

Next, as shown in FIG. 6, before the molten resin 300 is cooled, the second mold 102 is moved to change the axial dimension of the recess 130 to a final molding distance corresponding to the thickness of the flange portion 63, and the molten resin 300 in the recess 130 is compressed (secondary molding step). That is, the molten resin 300 that enters the recess 130 having an axial dimension larger than the thickness of the flange portion 63 in the primary molding step is compressed in the axial direction until the axial dimension of the recess 130 reaches the thickness of the flange portion 63 in the secondary molding step. As a result, the thickness of the flange portion 63 can be made relatively large even in the case of blow molding the thermoplastic resin.

As shown in FIG. 7, after the molten resin 300 is cooled and solidified, the first mold 100 and the second mold 120 are divided to take out a solidified and hollow resin molded product (mold releasing step). The hollow resin molded product is in a state where unnecessary portions are formed at two ends in the axial direction.

As shown in FIG. 8, the unnecessary portions of the hollow resin molded product are cut out, and manufacturing of the dust cover 6 is finished. In this manner, the cylindrical unnecessary portions are formed at end portions of the dust cover 6 in the axial direction during blow molding. When the protrusion 62b or the like is not formed and the flange portion 63 forms one end in the axial direction, a processing such as cutting out one end in the axial direction is extremely complicated and manufacturing costs increase. However, by forming the protrusion 62b at one side of the flange portion 63 in the axial direction, a processing on the one end in the axial direction is easy and costs can be reduced.

According to the suspension device 1, since the flange portion 63 that is a portion to be attached to the mount portion 4 in the dust cover 6 is formed to be thick, it is possible to improve strength of the portion to be attached to the mount portion 4 where a load is likely to be added in the dust cover 6. In addition, since the protrusion 62b of the dust cover 6 is received in the recessed portion 44 of the mount portion 4, the dust cover 6 can be implemented in a manner in which the protrusion 62b does not interfere with other components or the like while reducing manufacturing costs of the dust cover 6.

Although the protrusion 62b is formed on the flange portion 63 at an upper end of the dust cover 6 in the embodiment described above, it is needless to say that the flange portion 63 may be configured to form an end portion of the dust cover 6 in the axial direction. In this case, the recessed portion 44 of the mount portion 4 is unnecessary. A position in the axial direction where the flange portion 63 is formed can also be appropriately changed in the dust cover 6.

Although the mold 100 includes the first mold 101 and the second mold 102 and an axial dimension of the recess 130 of the mold 100 is changed by moving the second mold 102 relative to the first mold 101 in the above embodiment, the dimension of the recess may be changed using other variable devices.

Although a manufacturing method using the mold 100 in which an axial dimension of the recess 130 is changed is applied to the dust cover 6, the manufacturing method can be applied to a component other than the dust cover 6, such as an air conditioning duct, as long as the component is formed of a substantially cylindrical thermoplastic resin having bellows portions and a flange portion.

Although the exemplary embodiment of the present invention has been described above, the inventions described in the claims are not limited to the exemplary embodiment described above. It should be noted that all combinations of the features described in the exemplary embodiment are not necessarily essential to the solution to problems of the invention.

According to embodiments, a substantially cylindrical dust cover is formed of a thermoplastic resin molded by blow molding and covers an outer side of a damper extending in a predetermined direction. The dust cover includes bellows portions that are formed in a predetermined section in an axial direction in the dust cover, that are inclined alternately toward a radially outer side and a radially inner side in the axial direction, that each has a radially outer end thinner than a radially inner end, and that can expand and contract in the axial direction, and a flange portion that is formed at a predetermined position in the axial direction of the dust cover and extends radially outward from a cylindrical portion of the dust cover. The flange portion protrudes radially outward from the cylindrical portion of the dust cover by a dimension larger than a height dimension in a radial direction between the radially inner end and the radially outer end of each of the bellows portions, and a thickness of the flange portion is larger than a thickness of the radially outer end of each of the bellows portions.

According to the dust cover, it is possible to ensure strength of the flange portion by making the thickness of the flange portion relatively large while ensuring an expansion and contraction function by making the thickness of the radially outer end of each of the bellows portions relatively small.

In the dust cover, the thickness of the flange portion may be twice or more the thickness of the radially outer end of each of the bellows portions.

In the dust cover, the flange portion may be disposed at one end side of the dust cover in the axial direction.

According to the dust cover, the one end side of the dust cover in the axial direction can be attached to another component by engaging the flange portion with the component.

The dust cover may further include a protrusion that forms one end of the dust cover in the axial direction and protrudes from the flange portion to one side in the axial direction.

According to the dust cover, a cylindrical unnecessary portion are formed at an end portion in the axial direction during blow molding. When the protrusion or the like is not formed and the flange portion forms one end in the axial direction, a processing such as cutting out one end in the axial direction is extremely complicated and manufacturing costs increase. However, by forming the protrusion at one side of the flange portion in the axial direction, a processing on the one end in the axial direction is easy and costs can be reduced.

According to embodiments, a suspension device includes the dust cover that is disposed such that the axial direction is an upper-lower direction, a damper whose radially outer side is covered by the dust cover, a coil spring disposed at a radially outer side of the dust cover, a mount portion to which an upper end side of the damper is connected and that is attached to a vehicle body, and an upper seat that is disposed at a lower side of the mount portion and receives an upper end of the coil spring. The flange portion of the dust cover is interposed between the mount portion and the upper seat.

According to the suspension device, since the flange portion that is a portion to be attached to the mount portion in the dust cover is formed to be thick, it is possible to improve strength of the portion to be attached to the mount portion where a load is likely to be added in the dust cover.

According to embodiments, a suspension device includes the dust cover that is disposed such that the axial direction is an upper-lower direction, a damper whose radially outer side is covered by the dust cover, a coil spring disposed at a radially outer side of the dust cover, a mount portion to which an upper end side of the damper is connected and that is attached to a vehicle body, and an upper seat that is disposed at a lower side of the mount portion and receives an upper end of the coil spring. The flange portion of the dust cover is interposed between the mount portion and the upper seat, and the mount portion includes a recessed portion that is formed on a lower surface of the mount portion and receives the protrusion of the dust cover.

According to the suspension device, it is possible to improve strength of the portion to be attached to the mount portion of the dust cover while reducing manufacturing costs of the dust cover.

According to embodiments, an inner wall surface of a mold used in blow molding has a recess corresponding to the flange portion, and the mold has a variable device that changes an axial dimension of the recess to a final molding distance corresponding to a thickness of the flange portion and a primary molding distance larger than the final molding distance. A method for manufacturing the dust cover includes a placement step of placing a molten thermoplastic resin having a tubular shape inside the mold in a state where an axial dimension of the recess of the inner wall surface is set to the primary molding distance, a primary molding step of blowing air into the thermoplastic resin placed inside the mold in the placement step to deform the thermoplastic resin along the inner wall surface of the mold, and a secondary molding step of compressing, in the axial direction, a portion of the thermoplastic resin that is molded in the primary molding step and enters the recess by changing the axial dimension of the recess of the inner wall surface to the final molding distance.

According to the method for manufacturing the dust cover, the molten resin entering the recess having an axial dimension larger than the thickness of the flange portion in the primary molding step is compressed in the axial direction until the axial dimension of the recess reaches the thickness of the flange portion in the secondary molding step. As a result, the thickness of the flange portion can be made relatively large even in the case of blow molding the thermoplastic resin.

According to embodiments, a substantially cylindrical dust cover covers an outer side of a damper extending in a predetermined direction and includes bellows portions that can expand and contract in an axial direction and a flange portion that extends radially outward. An inner wall surface of a mold used in blow molding has a recess corresponding to the flange portion. The mold has a variable device that changes an axial dimension of the recess to a final molding distance corresponding to a thickness of the flange portion and a primary molding distance larger than the final molding distance. The method for manufacturing the dust cover includes a placement step of placing a molten thermoplastic resin having a tubular shape inside the mold in a state where an axial dimension of the recess of the inner wall surface is set to the primary molding distance, a primary molding step of blowing air into the thermoplastic resin placed inside the mold in the placement step to deform the thermoplastic resin along the inner wall surface of the mold, and a secondary molding step of compressing, in the axial direction, a portion of the thermoplastic resin that is molded in the primary molding step and enters the recess by changing the axial dimension of the recess of the inner wall surface to the final molding distance.

According to the method for manufacturing the dust cover, the molten resin entering the recess having an axial dimension larger than the thickness of the flange portion in the primary molding step is compressed in the axial direction until the axial dimension of the recess reaches the thickness of the flange portion in the secondary molding step. As a result, the thickness of the flange portion can be made relatively large even in the case of blow molding the thermoplastic resin.

In the method for manufacturing the dust cover, the mold includes a first mold corresponding to one side in an axial direction of the flange portion in the dust cover, and a second mold that is formed corresponding to the other side in the axial direction of the flange portion in the dust cover and can move relative to the first mold in the axial direction, and the recess of the inner wall surface may be formed by combining inner wall surfaces of the first mold and the second mold.

According to the method for manufacturing the dust cover, the axial dimension of the recess is changed by a movement of the second mold relative to the first mold in the axial direction.

According to embodiments, it is possible to ensure strength of the flange portion of the dust cover while using the thermoplastic resin in the dust cover.

REFERENCE SIGNS LIST

1 suspension device
2 coil spring
3 damper
4 mount portion
6 dust cover
44 recessed portion
61 bellows portion
62b protrusion
63 flange portion
100 mold
101 first mold
102 second mold
110 inner wall surface
111 inner wall surface
121 inner wall surface
130 recess
200 vehicle body
300 molten resin
T1 thickness of flange portion
T2 thickness of radially outer end of bellows portions

What is claimed is:

1. A dust cover that is formed of a thermoplastic resin, that is configured to cover an outer side of a damper extending in a predetermined direction, and that is substantially cylindrical, the dust cover comprising:
    bellows portions that are formed in a predetermined section in an axial direction in the dust cover, that are inclined alternately toward a radially outer side and a radially inner side in the axial direction, that each has a radially outer end thinner than a radially inner end, and that are configured to expand and contract in the axial direction;
    a flange portion that is formed at a predetermined position in the axial direction of the dust cover and extends radially outward from a cylindrical portion of the dust cover; and
    a protrusion that forms one end of the dust cover in the axial direction and protrudes from the flange portion to one side in the axial direction,
    wherein the flange portion protrudes radially outward from the cylindrical portion of the dust cover by a dimension larger than a height dimension in a radial direction between the radially inner end and the radially outer end of each of the bellows portions, wherein a thickness of the flange portion is larger than a thickness of the radially outer end of each of the bellows portions, and wherein the flange portion is disposed at one end side of the dust cover in the axial direction.

2. The dust cover according to claim 1, wherein the thickness of the flange portion is twice or more the thickness of the radially outer end of each of the bellows portions.

3. A suspension device comprising:
the dust cover according to claim 1 that is disposed such that the axial direction is an upper-lower direction;
a damper whose radially outer side is covered by the dust cover;
a coil spring disposed at a radially outer side of the dust cover;
a mount portion to which an upper end side of the damper is connected and that is attached to a vehicle body; and
an upper seat that is disposed at a lower side of the mount portion and receives an upper end of the coil spring,
wherein the flange portion of the dust cover is interposed between the mount portion and the upper seat.

4. A suspension device comprising:
the dust cover according to claim 1 that is disposed such that the axial direction is an upper-lower direction;
a damper whose radially outer side is covered by the dust cover;
a coil spring disposed at a radially outer side of the dust cover;
a mount portion to which an upper end side of the damper is connected and that is attached to a vehicle body; and
an upper seat that is disposed at a lower side of the mount portion and receives an upper end of the coil spring,
wherein the flange portion of the dust cover is interposed between the mount portion and the upper seat, and
wherein the mount portion includes a recessed portion that is formed on a lower surface of the mount portion and receives the protrusion of the dust cover.

5. A method for manufacturing a dust cover including bellows portions that are configured to expand and contract in an axial direction and a flange portion that extends radially outward,
the method comprising:
preparing a first mold and a second mold;
forming a recess corresponding to the flange portion by the first mold and the second mold;
preparing a variable device that changes an axial dimension of the recess between a primary molding distance and a final molding distance, the final molding distance corresponding to a thickness of the flange portion, and the primary molding distance being larger than the final molding distance;
placing a molten thermoplastic resin having a tubular shape inside the first mold and the second mold in a state where an axial dimension of the recess of an inner wall surface is set to the primary molding distance;
blowing air into the thermoplastic resin placed inside the first mold and the second mold to deform the thermoplastic resin along the inner wall surface of the first mold and the second mold; and
compressing, in the axial direction, a portion of the thermoplastic resin that enters the recess, by moving the second mold with respect to the first mold and changing the axial dimension of the recess of the inner wall surface to the final molding distance,
wherein the dust cover includes a protrusion that forms one end of the dust cover in the axial direction and protrudes from the flange portion to one side in the axial direction,
wherein the flange portion protrudes radially outward from a cylindrical portion of the dust cover by a dimension larger than a height dimension in a radial direction between the radially inner end and the radially outer end of each of the bellows portions, and
wherein the flange portion is disposed at one end side of the dust cover in the axial direction.

6. A method for manufacturing a substantially cylindrical dust cover configured to cover an outer side of a damper extending in a predetermined direction and including bellows portions that are configured to expand and contract in an axial direction and a flange portion that extends radially outward,
wherein an inner wall surface of a mold has a recess corresponding to the flange portion, and
wherein the mold has a variable device configured to change an axial dimension of the recess between a primary molding distance and a final molding distance, the final molding distance corresponding to a thickness of the flange portion, and the primary molding distance being larger than the final molding distance,
the method comprising:
placing a molten thermoplastic resin having a tubular shape inside the mold in a state where an axial dimension of the recess of the inner wall surface is set to the primary molding distance;
blowing air into the thermoplastic resin placed inside the mold to deform the thermoplastic resin along the inner wall surface of the mold; and
compressing, in the axial direction, a portion of the thermoplastic resin that enters the recess by changing the axial dimension of the recess of the inner wall surface to the final molding distance,
wherein the mold includes a first mold corresponding to one side in the axial direction of the flange portion in the dust cover, and a second mold corresponding to the other side in the axial direction of the flange portion in the dust cover and configured to move relative to the first mold in the axial direction,
wherein the recess of the inner wall surface is formed by combining inner wall surfaces of the first mold and the second mold, and the axial dimension of the recess is changed by a movement of the second mold relative to the first mold in the axial direction,
wherein the dust cover includes a protrusion that forms one end of the dust cover in the axial direction and protrudes from the flange portion to one side in the axial direction,
wherein the flange portion protrudes radially outward from a cylindrical portion of the dust cover by a dimension larger than a height dimension in a radial direction between the radially inner end and the radially outer end of each of the bellows portions, and
wherein the flange portion is disposed at one end side of the dust cover in the axial direction.

* * * * *